United States Patent
Lee et al.

(10) Patent No.: US 8,983,872 B2
(45) Date of Patent: Mar. 17, 2015

(54) APPARATUS AND METHOD FOR DIGITAL RIGHTS MANAGEMENT

(75) Inventors: Jae-won Lee, Yongin-si (KR); Seung-chul Chae, Suwon-si (KR); Kyung-im Jung, Seongnam-si (KR); Young-suk Jang, Uijeongbu-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1456 days.

(21) Appl. No.: 11/650,551

(22) Filed: Jan. 8, 2007

(65) Prior Publication Data

US 2007/0219921 A1     Sep. 20, 2007

(30) Foreign Application Priority Data

Feb. 24, 2006 (KR) .................. 10-2006-0018290

(51) Int. Cl.
*G06F 21/00* (2013.01)
*G06F 21/10* (2013.01)
*G06Q 10/06* (2012.01)
*H04L 29/06* (2006.01)
*H04L 9/32* (2006.01)

(52) U.S. Cl.
CPC ............... *G06F 21/10* (2013.01); *G06Q 10/06* (2013.01); *H04L 63/0428* (2013.01); *H04L 9/3247* (2013.01); *H04L 9/3273* (2013.01); *H04L 2463/101* (2013.01); *H04L 2209/603* (2013.01)
USPC ............................... 705/59; 713/158; 726/26

(58) Field of Classification Search
USPC .......................................................... 705/59
See application file for complete search history.

(56) References Cited

U.S. PATENT DOCUMENTS

| 2003/0126086 A1* | 7/2003 | Safadi .................. 705/51 |
| 2005/0065891 A1* | 3/2005 | Lee et al. .............. 705/59 |
| 2005/0071418 A1* | 3/2005 | Kjellberg et al. ..... 709/200 |
| 2005/0132208 A1 | 6/2005 | Hug et al. |
| 2005/0210241 A1* | 9/2005 | Lee et al. .............. 713/158 |
| 2006/0021057 A1* | 1/2006 | Risan et al. ........... 726/26 |
| 2006/0056324 A1* | 3/2006 | Hyyppa et al. ........ 370/310 |
| 2006/0259433 A1* | 11/2006 | Lahtinen et al. ..... 705/57 |
| 2007/0027814 A1* | 2/2007 | Tuoriniemi ........... 705/59 |
| 2008/0040618 A1* | 2/2008 | Andersson et al. ... 713/193 |

FOREIGN PATENT DOCUMENTS

| CN | 1598735 A | 3/2005 |
| JP | 2003-223371 A | 8/2003 |
| JP | 2003-288538 A | 10/2003 |
| JP | 2003-303248 A | 10/2003 |

(Continued)

OTHER PUBLICATIONS

OMA DRM Specification, Draft Version 2.0, Open Mobile Alliance [online], Apr. 10, 2004 [retrieved on Jun. 3, 2010]. Retrieved from the Internet: <URL: http://member.openmobilealliance.org/ftp/Public_documents/DRM/Permanent_documents/>.*

(Continued)

*Primary Examiner* — Jamie Kucab
(74) *Attorney, Agent, or Firm* — Sughrue Mion, PLLC

(57) ABSTRACT

An apparatus and method is provided for digital rights management. The method for digital rights management includes receiving encrypted content and a rights object representing use rights of the encrypted content, receiving a software module managing the rights object, and generating a new rights object using the software module.

6 Claims, 5 Drawing Sheets

(56) References Cited

FOREIGN PATENT DOCUMENTS

| | | |
|---|---|---|
| JP | 2005-071339 A | 3/2005 |
| JP | 2005-159703 A | 6/2005 |
| KR | 10-2005-0101940 A | 10/2005 |
| KR | 10-2006-0011760 A | 2/2006 |
| WO | 2004/102459 A1 | 11/2004 |

OTHER PUBLICATIONS

Communication issued by the Japanese Patent Office on Sep. 7, 2010 in counterpart Japanese Patent Application No. 2007-029252.

* cited by examiner

APPARATUS AND METHOD FOR DIGITAL RIGHTS MANAGEMENT

CROSS-REFERENCE TO RELATED APPLICATION

This application claims priority from Korean Patent Application No. 10-2006-18290 filed on Feb. 24, 2006 in the Korean Intellectual Property Office, the disclosure of which is incorporated herein by reference in its entirety.

BACKGROUND OF THE INVENTION

1. Field of the Invention

Apparatuses and methods consistent with the present invention relates to digital rights management, and more particularly, to digital rights management, whereby a licensing work centering around a rights object issuer can be performed in respective devices.

2. Description of the Prior Art

Recently, digital rights management (DRM) has been researched actively, and commercial services using this DRM have already been used or will be used. A technical concept of DRM is to protect digital content of which illegal copying and distribution can be easily performed.

Some efforts have been made to protect the digital content. In the related art, digital content protection has been concentrated on preventing an access to digital content without permission. For example, only those people who have paid charges are permitted to access the digital content. However, a person who has not paid the charges cannot access the digital content.

However, due to the characteristics of digital data, digital content can be readily copied without loss, reused, processed and distributed to third parties. Accordingly, when a person who has paid the charges accesses the digital content and intentionally distributes it to a third party, the third party can use the digital content without paying the charges, from which a number of problems have been caused.

In order to solve these problems, in DRM, digital content is encrypted and distributed, and in order to use the encrypted digital content, a license that is called a rights object (RO) is required.

FIG. 1 is a view illustrating a related art system for digital rights management. Referring to FIG. 1, a device 10 can obtains digital content from a content provider 20. In this case, the digital content provided by the content provider 20 is in an encrypted state, and in order to use the encrypted digital content, a rights object is required.

The device 10 can obtain the rights object including rights to use the encrypted digital content from a rights object issuer 30, and for this a user should pay a predetermined charge.

The rights object includes a key for decrypting the encrypted digital content.

The rights object issuer 30 reports details of rights object issuance to the content provider 20, and according to circumstances, the rights object issuer 30 and the content provide 20 may be the same subject.

The device 10 having acquired the rights object can use the encrypted digital content by consuming the rights object.

On the other hand, encrypted digital content may be freely copied and distributed to other devices (not illustrated). However, since the rights object includes information about the limitation of the number of times for which the encrypted digital content can be used, a duration, the number of times for which the copy of the rights object is permitted, and so forth, it should be limited by reuse or copy. According to this DRM technology, digital content can be effectively protected.

However, in the related art DRM system as illustrated in FIG. 1, in order for the device 10 to share content with another device (not illustrated), the other device should receive the rights object from the rights object issuer 30 through a separate process.

In other words, the sharing of content between devices is not free, and the device having received the encrypted digital content should communicate with the rights object issuer 30 to obtain the rights object. This is because the change of the rights object such as an update, correction, and transfer of the rights object, i.e., a licensing work, is performed by the rights object issuer 30.

In addition, if a second device that does not belong to a domain of a first device intends to share the encrypted digital content that can be shared in the domain with the first device, in a state that the first device shares a key and belongs to the domain as a logical set in which the content sharing is possible, the second device should pass through a separate process for subscribing the domain to cause inconvenience in use.

In this respect, there is a growing need to share encrypted digital content between devices in a more convenient method.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and method for digital rights management, which can provide a mobility to the licensing function of a rights object issuer so that a licensing work centering around the rights object issuer is performed in respective devices.

According to an aspect of the present invention, there is provided an apparatus for digital rights management, the apparatus including a storage module which stores encrypted content, a rights object, and a software module managing the rights object, a control module which decrypts the encrypted content by analyzing and consuming the rights object by operating the software module stored in the storage module, and a playback module which plays the decrypted content.

According to another aspect of the present invention, there is provided an apparatus for digital rights management, the apparatus including a storage module which stores encrypted content, a rights object, and a software module managing the rights object, a control module which generates a new rights object based on the stored rights object by operating the software module stored in the storage module and decrypts the encrypted content by analyzing and consuming the new rights object, and a playback module which plays the decrypted content.

According to another aspect of the present invention, there is provided a method for digital rights management, the method including receiving encrypted content and a rights object representing use rights of the encrypted content, receiving a software module managing the rights object, and generating a new rights object using the software module.

According to another aspect of the present invention, there is provided a method for digital rights management, the method including receiving encrypted content and a rights object representing use rights of the encrypted content, receiving a software module managing the rights object, generating a new rights object using the software module based on the received rights object, and playing the encrypted content by analyzing and consuming the new rights object using the software module.

BRIEF DESCRIPTION OF THE DRAWINGS

The above and other aspects of the present invention will be more apparent from the following detailed description of exemplary embodiments taken in conjunction with the accompanying drawings, in which.

DETAILED DESCRIPTION OF EXEMPLARY EMBODIMENTS OF THE INVENTION

Figure 1:
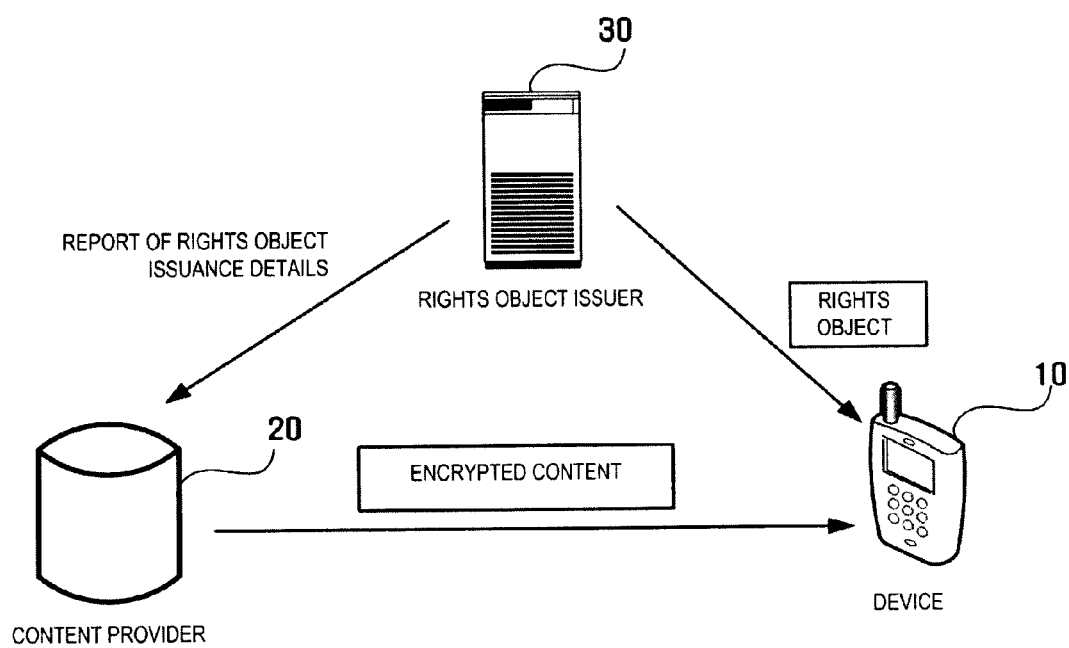
FIG. 1 is a view illustrating a related art system for digital rights management.

Hereinafter, exemplary embodiments of the present invention will be described in detail with reference to the accompanying drawings. However, the present invention is not limited to the exemplary embodiments disclosed hereinafter, but can be implemented in diverse forms. The matters defined in the description, such as the detailed construction and elements, are provided to assist those of ordinary skill in the art in a comprehensive understanding of the invention, and the present invention is only defined within the scope of the appended claims. In the entire description of the present invention, the same drawing reference numerals are used for the same elements across various figures.

The present invention will be described hereinafter with reference to the accompanying drawings illustrating block diagrams and flowcharts for explaining a system having a virtual machine mounted thereon to perform an apparatus and method for digital rights management according to exemplary embodiments of the present invention. It will be understood that each operation and combinations of operations in the flowchart illustrations can be implemented by computer program instructions. These computer program instructions can be provided to a processor of a general purpose computer, a special purpose computer, or other programmable data processing apparatus to produce a machine, such that the instructions, which are executed via the processor of the computer or other programmable data processing apparatus, create means for implementing the functions specified in the flowchart.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the functions specified in the flowchart.

The computer program instructions may also be loaded onto a computer or other programmable data processing apparatus to cause a series of operational steps to be performed on the computer or other programmable apparatus to produce a computer implemented process, such that the instructions, which are executed on the computer or other programmable apparatus, provide steps for implementing the functions specified in the flowchart.

Also, each operation of the flowchart illustrations may represent a module, segment, or portion of code, which comprises one or more executable instructions for implementing the specified logical function(s). It should also be noted that in some alternative implementations, the functions noted in the operations may occur out of the order. For example, two blocks shown in succession may in fact be executed substantially concurrently, or the blocks may sometimes be executed in the reverse order, depending upon the functionality involved.

Figure 2:
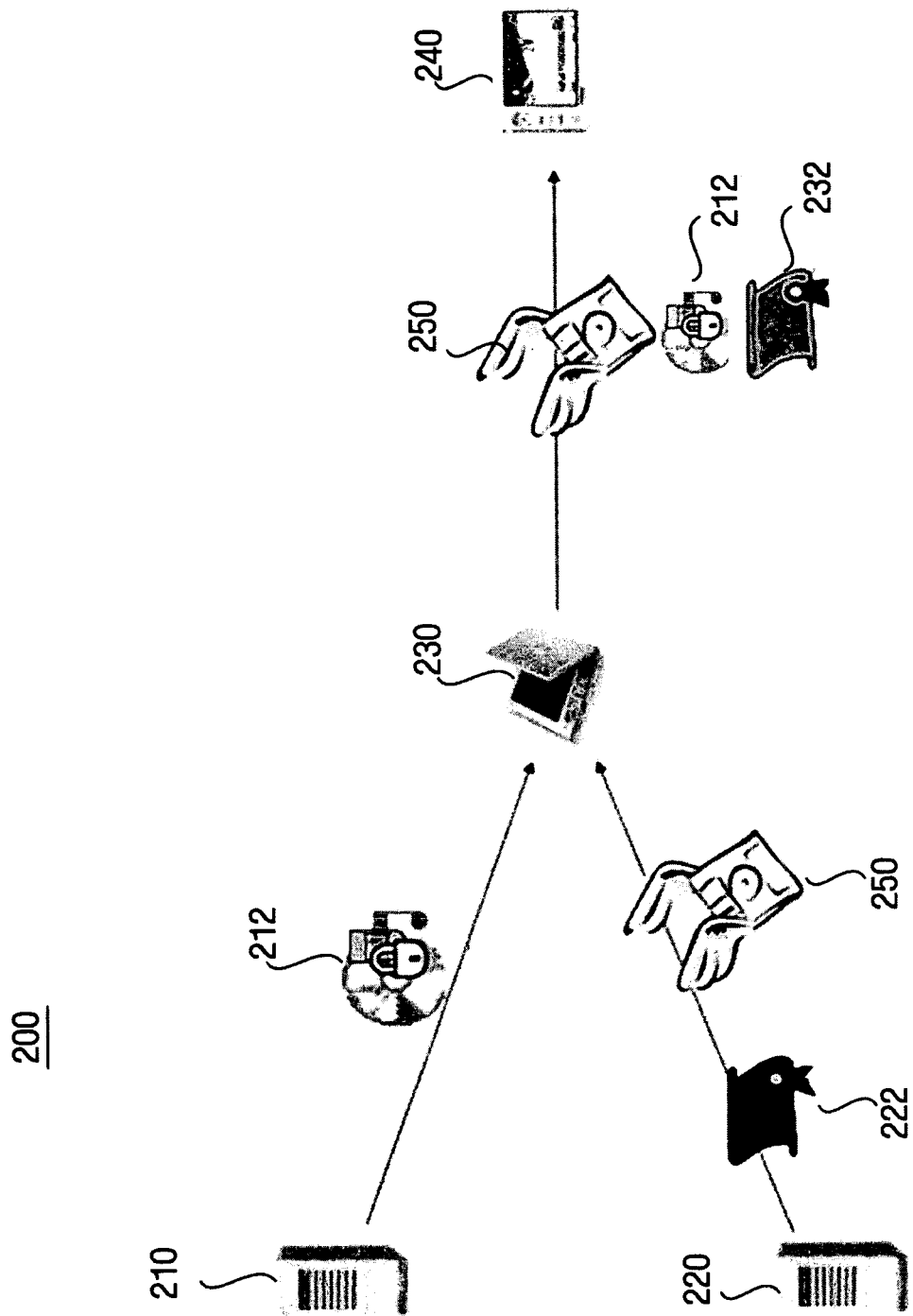
FIG. 2 is a view illustrating a system for digital rights management according to an exemplary embodiment of the present invention.

FIG. 2 is a view illustrating a system for digital rights management according to an exemplary embodiment of the present invention.

Referring to FIG. 2, the system for digital rights management 200 includes a content provider 210, a rights object issuer 220, a first device 230, and a second device 240.

The content provider 210 provides encrypted digital content 212 to the first device 230, and the rights object issuer 220 provides a rights object 222 and a mobile DRM agent 250 to the first device 230.

Here, the rights object 222 means a license having rights to use the encrypted digital content, and may include information about the limitation of the number of times for which the encrypted digital content can be used, a duration, the number of times for which the copy of the rights object is permitted, and so forth. In order for the first device 230 to receive the rights object 222, a predetermined charge should be paid to the content provider 210 and the rights object issuer 220.

In addition, the rights object 222 includes a key for decrypting the encrypted digital content, and may be electronically signed and transferred to the first device 230.

The mobile DRM agent 250 is an executable software module that generates a new rights object on the basis of the existing rights object, and permits the second device 240, not the first device 230, to consume the new rights object. Here, if the number of content playbacks is limited to five times by the rights object, in relation to the meaning of "consume the rights content," the remaining number of playbacks is limited to four times in the event that the rights object is once played by the device, and at this time, it may be understood that the mobile DRM agent 250 has consumed the rights object.

The mobile DRM agent 250 may add an electronic signature to the rights object 222.

On the other hand, the content provider 210 and the rights object issuer 220 may be the same subject.

The first device 230 downloads the encrypted digital content 212 from the content provider 210 and stores the downloaded encrypted digital content 212. After the settlement is made for the content purchase, the first device 230 receives and consumes the rights object 222 and the mobile DRM agent 250 from the rights object issuer 220.

If a user intends to move the encrypted digital content 212 to the second device 240, the first device 230 provides the encrypted digital content 212 and a rights object 232 generated on the basis of the existing rights object 222 by the mobile DRM agent 250 to the second device 240, and provides the mobile DRM agent 250.

The rights object 232 provided by the first device 230 may be generated by the mobile DRM agent 250 in the first device, on the basis of the limit information of the rights object 222 that the first device 230 has received from the rights object issuer 220.

The second device 240 can use the encrypted digital content 250 according to the limit information of the rights object 232 received from the first device 230.

Figure 3:
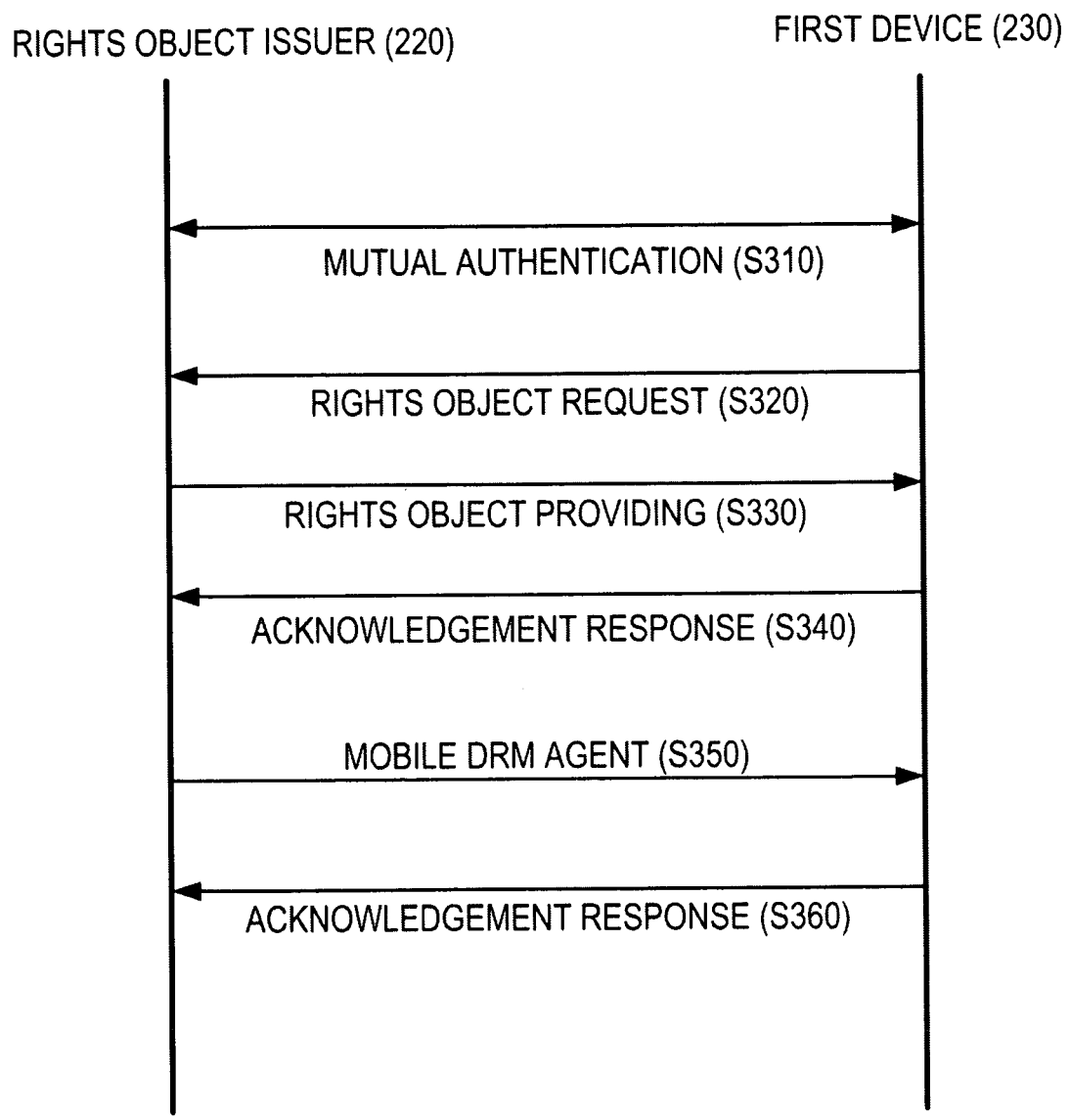
FIG. 3 is a view illustrating a process in which a rights object issuer provides a rights object and a mobile DRM agent to a first device according to an exemplary embodiment of the present invention.

FIG. 3 is a view illustrating a process in which the rights object issuer provides a rights object and a mobile DRM agent to the first device according to an exemplary embodiment of the present invention. It is assumed that the first device 230 receives the encrypted digital content 212 from the content provider 210 and stores the received encrypted digital content 212 therein.

First, the rights object issuer 220 and the first device 230 perform a mutual authentication with each other through a wire/wireless communication network (S310).

This mutual authentication can be performed using a mechanism for mutual authentication in the conventional digital rights management technology. The conventional digital rights management technology may be the Open Mobile Alliance (OMA) DRM technology or the DRM system of Microsoft Corporation in the U.S.

If the mutual authentication between the rights object issuer 220 and the first device 230 is normally completed, the first device 230 requests the rights object for playing the encrypted digital content to the rights object issuer 220 (S320). In this case, it is assumed that the settlement for the content purchase has been completed.

In response to this request, the rights object issuer 220 provides the corresponding rights object to the first device 230, and in this case, the rights object may be electronically signed by the rights object issuer 220 (S330).

When the rights object is normally received, the first device 230 stores the received rights object in its storage space, and transmits an acknowledgement response to the rights object issuer 220 (S340).

If the rights object issuing procedure from the rights object issuer 220 to the first device 230 is completed, the rights object issuer 220 transmits a mobile DRM agent to the first device 230 (S350).

When the mobile DRM agent is normally received, the first device 230 stores the received DRM agent in its storage space. Then, if the mobile DRM agent is ready to operate, the first device 230 transmits the acknowledgement response to the rights object issuer 220 (S360).

The mobile DRM agent stored in the first device 230 promotes the playback of the pre-stored encrypted digital content by analyzing and consuming the rights object already issued and stored.

On the other hand, if the mobile DRM agent suitable to the playback of the encrypted digital content has already been stored in the first device 230 and is ready to operate, operations S350 and S360 can be omitted.

Figure 4:
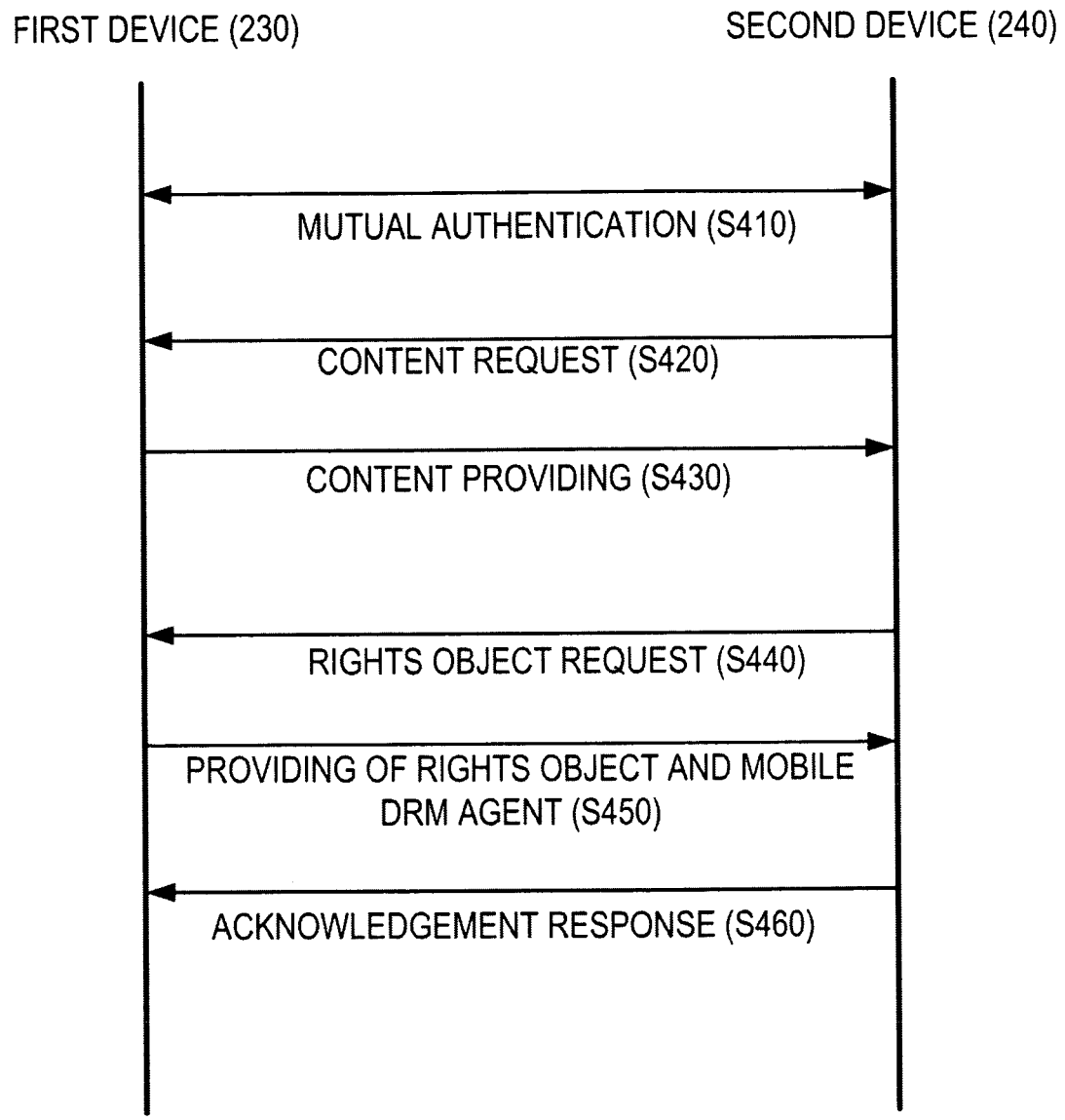
FIG. 4 is a view illustrating a process in which the first device provides encrypted content and the rights object to a second device according to an exemplary embodiment of the present invention.

FIG. 4 is a view illustrating a process in which the first device provides encrypted content and the rights object to the second device according to an exemplary embodiment of the present invention. In this process, a user transmits the encrypted digital content from the first device 230 to the second device 240, and plays the transmitted encrypted digital content in the second device 240.

First, the first device 230 and the second device 240 perform mutual authentication through a wire/wireless communication network (S410). In this case, a channel such as a secure session may be formed for the communication between the first device 230 and the second device 240.

Then, the second device 240 selects desired content from a content list stored in the first device 230 and requests the desired content to the first device 230 (S420). For this, the second device 240 pre-stores the content list stored in the first device 230, or receives the content list from the first device 230 in operation S410.

The first device 230 transmits the requested content to the second device 240 in an encrypted form, and the second device 240 receives and stores the content in the storage space in the second device 240 (S430).

The second device 240 requests the rights object required to play the received content to the first device 230 (S440).

The first device 230 determines whether to accept the received request by analyzing its own rights object, and if possible, it generates the rights object to be transmitted to the second device 240 using the mobile DRM agent. In this case, the rights object may be generated on the basis of the limit information of the rights object received from the rights object issuer 220, and may be electronically signed by the mobile DRM agent being executed in the first device 230. Then, the first device 230 provides the generated rights object to the second device 240 (S450).

In this case, the first device may also transmit the mobile DRM agent to the second device 240.

If the second device 240 has normally received and stored the mobile DRM agent in the storage space and the mobile DRM agent is ready to operate, the second device 240 transmits an acknowledgement response to the first device 230 (S460).

The mobile DRM agent stored in the second device 240 may analyze the rights object received from the first device 230, and generate a rights object to be consumed in a third device (not illustrated).

In FIG. 4, it is exemplified that the rights object is generated by the mobile DRM agent in the first device 230 and transmitted to the second device 240, but the exemplary embodiment is not limited thereto.

For example, the second device 240 may receive the rights object, which the first device 230 has received from the rights object issuer 220, from the first device 230 as it is, and the mobile DRM agent in the second device 240 may generate a new rights object suitable to the playback of the encrypted content on the basis of the transferred rights object, so that the second device 240 consumes the newly generated rights object to play the encrypted content.

Figure 5:
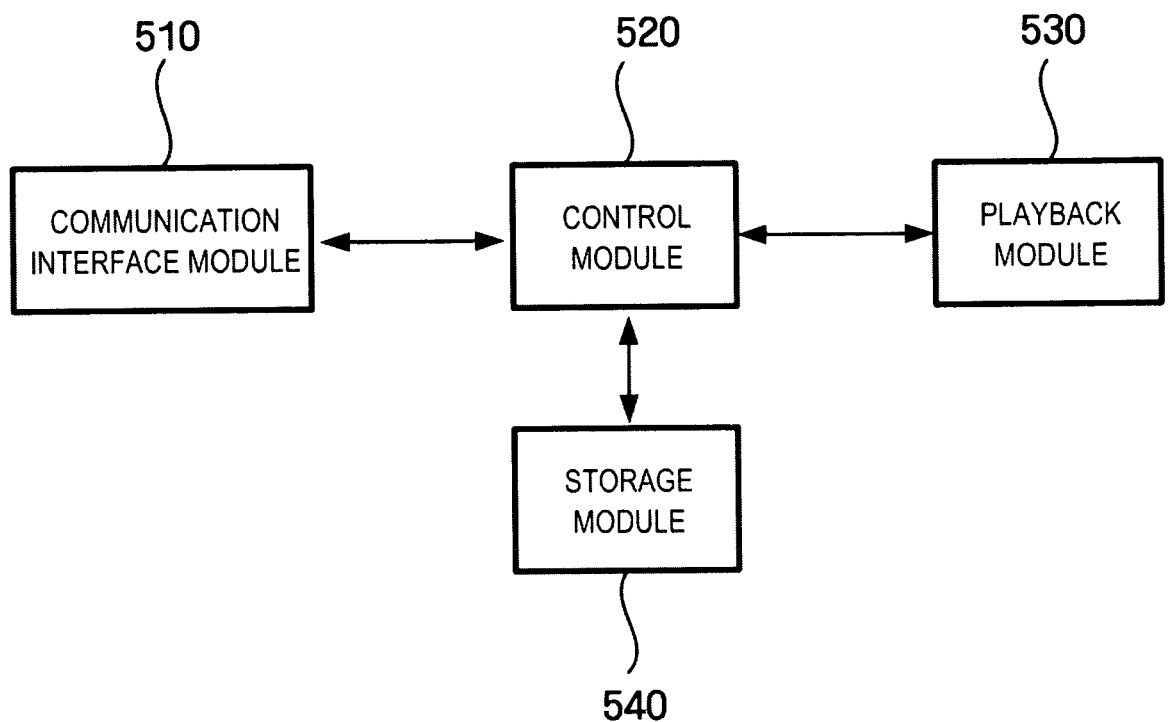
FIG. 5 is a block diagram illustrating a structure of an apparatus for digital rights management according to an exemplary embodiment of the present invention.

FIG. 5 is a block diagram illustrating a structure of an apparatus for digital rights management according to an exemplary embodiment of the present invention. The apparatus for digital rights management 500 refers to the first device 230 or the second device 240 as described above.

Referring to FIG. 5, the apparatus for digital rights management 500 includes a communication interface module 510, a control module 520, a playback module 530, and a storage module 540.

In the exemplary embodiments of the present invention, the term "module," as used herein, means, hardware component, such as a Field Programmable Gate Array (FPGA) or Application Specific Integrated Circuit (ASIC), which performs certain tasks.

The communication interface module 510 is a module for communications with another digital rights management apparatus, the rights object issuer, or the content provider, and may be provided with a wire communication module or a wireless communication module according to the communication media.

The storage module 540 stores the content, the rights object, and the mobile DRM agent received from another digital rights management apparatus, the rights object issuer, or the content provider, through the communication interface module 510. In particular, since the rights object plays a very important role in the digital rights management system, it is required to safely protect the storage space of the storage module 540, in which the rights object is stored, from accesses of other external devices. For this purpose, the rights object may be stored in a storage region that can be secured by hardware, or may be stored in an encrypted state using various kinds of encryption algorithm to protect the rights object by software.

The control module 520 stores the content, the rights object, and the mobile DRM agent received through the communication interface module 510 in the storage module 540. Also, the control module 520 performs a mutual authentication with the rights object issuer or another digital rights management apparatus through operation S310 or operation S410, as shown in FIGS. 3 and 4 respectively, and controls the data transmission/reception according to the preset protocol.

The playback module 530 plays the content decrypted by the control module 520 and outputs the content in the form of an audio, video or text.

If the apparatus for digital rights management 500 intends to transmit the mobile DRM agent to another digital rights management apparatus, the control module 520 extracts the encrypted content from the storage module 540 and transmits the extracted encrypted content to another digital rights management apparatus. Then, the control module 520 generates a new rights object using the mobile DRM agent on the basis of the rights object stored in the storage module 540, and transmits the generated rights object and the mobile DRM agent to another digital rights management apparatus through the communication interface module 510.

The control module 520 may not generate a new rights object using the mobile DRM agent, but may transmit the rights object stored in the storage module 540 to another digital rights management device as it is. In this case, another digital rights management apparatus may use the encrypted content by generating a new rights object on the basis of the received rights object using the received mobile DRM agent.

In FIG. 5, it is exemplified that the control module 520 decrypts the encrypted content. However, this is exemplary, and the decryption may be performed by the playback module 530.

As described above, according to an exemplary embodiment of the present invention, devices can share encrypted digital content in a more convenient method.

What is claimed is:

1. A method for digital rights management in a device, the method comprising:
   at the device, receiving encrypted content from a transmitting device;
   at the device, receiving a rights object representing use rights of the encrypted content and software configured to generate a new rights object based on the received rights object, from the transmitting device;
   at the device, based on the received rights object, generating the new rights object using the received software: and
   providing by the device, the new rights object to another device, and
   wherein the rights object received from the transmitting device is a license that permits the device receiving the rights object from the transmitting device to use the encrypted content, and the new rights object is a license that permits the other device to use the encrypted content and does not permit the device receiving the rights object from the transmitting device to use the encrypted content.

2. The method of claim 1, further comprising playing the encrypted content by analyzing and consuming the received rights object using the software.

3. The method of claim 1, further comprising providing the new rights object.

4. The method of claim 1, wherein the rights object is electronically signed.

5. A non-transitory computer readable recording medium having computer-executable program instructions for performing a method for digital rights management in a device, the method comprising:
   receiving encrypted content from a transmitting device;
   receiving by the device, a rights object representing use rights of the encrypted content and software configured to generate a new rights object based on the received rights object, from the transmitting device;
   generating, based on the received rights object, the new rights object using the received software; and
   providing by the device, the new rights objects to another device, and
   wherein the rights object received from the transmitting device is a license that permits the device receiving the rights object from the transmitting device to use the encrypted content, and the new rights object is a license that permits the other device to use the encrypted content and does not permit the device receiving the rights object from the transmitting device to use the encrypted content.

6. A non-transitory computer readable recording medium having computer-executable program instructions for performing a method for digital rights management in a device, the method comprising:
   receiving encrypted content from a transmitting device;
   receiving by the device, a rights object representing use rights of the encrypted content and software configured to generate a new rights object based on the received rights object, from the transmitting device;
   generating the new rights object using the received software based on the received rights object; and
   playing the encrypted content by analyzing and consuming the new rights object using the software,
   wherein the rights object received from the transmitting device is a license that permits the transmitting device to use the encrypted content, and the new rights object is a license that permits the device receiving the rights object to use the encrypted content and does not permit the transmitting device to use the encrypted content.

* * * * *